(12) United States Patent
Ljungberg et al.

(10) Patent No.: US 9,109,290 B2
(45) Date of Patent: Aug. 18, 2015

(54) COATED CUTTING TOOL INSERT

(75) Inventors: Björn Ljungberg, Enskede (SE); Susanne Norgren, Huddinge (SE)

(73) Assignee: Sandvik Intellectual Property AB, Sandviken (SE)

( * ) Notice: Subject to any disclaimer, the term of this patent is extended or adjusted under 35 U.S.C. 154(b) by 52 days.

(21) Appl. No.: 12/828,742

(22) Filed: Jul. 1, 2010

(65) Prior Publication Data
US 2011/0002749 A1    Jan. 6, 2011

(30) Foreign Application Priority Data
Jul. 3, 2009  (EP) .................................... 09008753

(51) Int. Cl.
B32B 19/00 (2006.01)
C23C 28/00 (2006.01)
C23C 30/00 (2006.01)

(52) U.S. Cl.
CPC .............. *C23C 28/00* (2013.01); *C23C 30/005* (2013.01); *B23B 2224/32* (2013.01); *B23B 2228/105* (2013.01); *Y10T 407/27* (2015.01)

(58) Field of Classification Search
None
See application file for complete search history.

(56) References Cited

U.S. PATENT DOCUMENTS

| | | | |
|---|---|---|---|
| 4,892,792 A * | 1/1990 | Sarin et al. ................. | 428/698 |
| 5,232,318 A | 8/1993 | Santhanam et al. | |
| 5,487,625 A | 1/1996 | Ljungberg et al. | |
| 5,654,035 A | 8/1997 | Ljungberg et al. | |
| 5,722,803 A | 3/1998 | Battaglia et al. | |
| 5,851,687 A | 12/1998 | Ljungberg | |
| 5,861,210 A | 1/1999 | Lenander et al. | |
| 5,879,823 A | 3/1999 | Prizzi et al. | |
| 6,293,739 B1 | 9/2001 | Uchino et al. | |
| 6,338,894 B1 * | 1/2002 | Hirakawa et al. ............ | 428/216 |
| 6,350,510 B1 * | 2/2002 | Konig et al. ................. | 428/216 |
| 6,756,111 B1 | 6/2004 | Okada et al. | |
| 6,869,334 B1 | 3/2005 | Leyendecker et al. | |
| 6,884,496 B2 | 4/2005 | Westphal et al. | |
| 7,655,293 B2 | 2/2010 | Ljungberg | |
| 2006/0204757 A1 | 9/2006 | Ljungberg | |
| 2007/0009763 A1 | 1/2007 | Littecke et al. | |
| 2008/0166527 A1 | 7/2008 | Lenander et al. | |
| 2009/0269150 A1 * | 10/2009 | Omori et al. ................. | 407/114 |
| 2010/0232893 A1 | 9/2010 | Imamura et al. | |
| 2010/0260561 A1 * | 10/2010 | Moriguchi et al. .......... | 407/119 |

FOREIGN PATENT DOCUMENTS

| | | |
|---|---|---|
| CN | 1824440 A | 8/2006 |
| EP | 0 603 144 | 6/1994 |
| EP | 1 017 870 B1 | 10/2002 |
| EP | 1 029 108 B1 | 3/2005 |
| EP | 1 696 051 A1 | 8/2006 |
| EP | 1944391 A1 | 7/2008 |
| JP | H8-209335 A | 8/1996 |
| JP | 2001-062603 A | 3/2001 |
| WO | 99/23275 | 5/1999 |
| WO | 02/077312 A2 | 10/2002 |
| WO | 2008/031768 A1 | 3/2008 |
| WO | WO-2008031768 A1 | 3/2008 |
| WO | 2009/051046 A1 | 4/2009 |

OTHER PUBLICATIONS

I. C. Noyan et al., Residual Stress Measurement by Diffraction and Interpretation, SpringerVerlag, New York, 1987 (pp. 117-130).
European Search Report from related European Patent Application No. 09008753.7, dated Sep. 23, 2009, 5 pages.
Office Action issued in Chinese Application No. 201010222510.5 dated Aug. 30, 2013.

* cited by examiner

*Primary Examiner* — Mark Ruthkosky
*Assistant Examiner* — Daniel J Schleis
(74) *Attorney, Agent, or Firm* — Morgan, Lewis & Bockius LLP

(57) ABSTRACT

A coated cutting tool includes a coating and a substrate. The substrate is at least partly coated with a 4-10 μm thick coating comprising two adjacent Ti(C,N)-layers where the difference (Δ) between the residual stress state of the inner layer and the residual stress state of the outer layer is 1000 MPa≤Δ≤2500 MPa, on at least a part of the cutting edge and/or on at least a part of the rake face. A method to produce such a difference between the residual stress states is also disclosed.

11 Claims, No Drawings tool inserts much tougher than CVD-coated tool inserts and are therefore often preferred in interrupted cutting operations, e.g. milling. The drawback of PVD coated inserts are generally the lower wear resistance and insufficient coating adhesion when compared to CVD coated inserts.

Hence, there is constantly a strong strive to find means to improve the toughness behaviour of CVD-coated tool inserts while keeping the high wear resistance.

Post treatment of coated cutting inserts by brushing or by wet blasting is disclosed in several patents. The purpose is to achieve a smooth cutting edge and/or to expose the $Al_2O_3$ along the edge line as disclosed in U.S. Pat. No. 5,851,687 and in EP 603 144 or to obtain the $Al_2O_3$ as the top layer also on the rake face in those cases when TiN is used as a wear detection layer at the flank face as disclosed in U.S. Pat. No. 5,861,210. Every treatment technique that exposes a CVD coating surface to an impact force such as wet- or dry blasting will lower the tensile stresses of the coating and thereby improve the toughness of the coated tool as disclosed in US 2006/0204757A1. A dry blasting method is disclosed in EP 1 311 712. Here a very high blasting pressure is used to obtain high compressive stresses. Such high blasting pressure will deteriorate the coating and produce an uneven edge line, this is particularly pronounced for inserts with sharp edges (radius <35 μm).

COATED CUTTING TOOL INSERT

RELATED APPLICATION DATA

This application claims priority under 35 U.S.C. §119 and/or §365 to European Patent Application No. 09008753.7, filed Jul. 3, 2009, the entire contents of which are incorporated herein by reference.

FIELD

The present disclosure relates to a CVD coated cutting tool insert suitable for machining of metals by turning, milling, drilling or by similar chip forming machining methods. The coated tool insert shows a significant improved toughness behaviour when used in interrupted cutting operations.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Modern high productivity chip forming machining of metals requires reliable cutting tool inserts which posses high wear resistance, good toughness properties, ability to produce work pieces with high surface finish, resistance to chip hammering, be able to produce reasonable low cutting forces and have excellent resistance to plastic deformation.

Modern cemented carbide tools are generally in the shape of an indexable insert clamped in a tool holder, but can also be in the form of a solid carbide drill or a milling cutter. Cemented carbide cutting tool inserts coated with various types of hard layers like TiC, $TiC_xN_y$, TiN, $TiC_xN_yO_z$ and $Al_2O_3$ have been commercially available for many years. Several hard layers in a multilayer structure generally build up such coatings. The sequence and the thickness of the individual layers are carefully chosen to suit different cutting application areas and work-piece materials.

The coatings are most frequently deposited by Chemical Vapour Deposition (CVD) or Physical Vapour Deposition (PVD) techniques.

The CVD-technique has several advantages. It allows large coating batches, produces coatings with good coating thickness distribution on complex shaped inserts, can be used to deposit electrical non-conducting layers like $Al_2O_3$ and $ZrO_2$. Many different materials can be deposited in the same coating run, e.g. $Al_2O_3$, TiC, $Ti(C_xN_y)$, TiN, $Ti(C_xN_yO_z)$, $Zr(C_xN_y)$, $Ti(C_xN_y)$ and $ZrO_2$.

The CVD technique is generally conducted at a rather high temperature range, 900-1050° C. Due to the high deposition temperature and due to a mismatch in thermal coefficient of expansion between the deposited coating materials and the cemented carbide tool substrate, CVD produces coatings with cooling cracks and tensile stresses. CVD coated inserts therefore appear more brittle than PVD coated inserts when used in a cutting operation.

PVD processes run at a significantly lower temperature, 450-650° C. and are performed under strong ion bombardment which leads to crack free layers with high compressive stresses. The high compressive stresses and the absence of cooling cracks make PVD coated tool inserts much tougher than CVD-coated tool inserts and are therefore often preferred in interrupted cutting operations, e.g. milling. The

SUMMARY

It is an object of the present invention to provide a CVD-coated cutting tool useful for wear and toughness demanding cutting operations. It is a further object of the present invention to provide a method of making CVD-coated cutting tool with improved properties.

It has been found that a significant, improved toughness performance and high wear resistance can be achieved with a cutting tool insert according to the present disclosure. It has been found that a cutting tool insert with a coating comprising two adjacent Ti(C,N) wear layers with different properties possesses high wear resistance and good toughness properties when cutting low alloyed and stainless steel. It was also found that during cutting the outer N-rich layer gives the coated insert less smearing and less pulling out of coating fragments along edge line which makes it particular useful for cutting smearing materials. A more carbon rich (111) and/or (422) textured inner layer gives the insert a good flank wear resistance.

An exemplary embodiment of a coated cutting tool comprises a coating, and a substrate, wherein the substrate is at least partly coated with a 4-10 μm thick coating comprising two adjacent Ti(C,N)-layers, an inner $Ti(C_x,N_y)$-layer, where x+y=1, and an outer $Ti(C_i,N_j)$-layer, where i+j=1, and j>y, and wherein the difference Δ between a residual stress state of the inner $Ti(C_x,N_y)$-layer and a residual stress state of the outer $Ti(C_i,N_j)$-layer is 1000 MPa≤Δ≤2500 MPa, on at least a part of a cutting edge and/or on at least a part of a rake face.

An exemplary embodiment of a method of making a coated cutting tool, the coated cutting tool including a coating and a substrate wherein the coating comprises two adjacent Ti(C,N)-layers, an inner $Ti(C_x,N_y)$-layer, where x+y=1, and an outer $Ti(C_i,N_j)$-layer, where i+j=1, and j>y, comprises subjecting the coating to a wet blasting operation resulting in a difference Δ between a residual stress state of the inner $Ti(C_x,N_y)$-layer and a residual stress state of the outer $Ti(C_i,N_j)$-layer of 1000 MPa≤Δ≤2500 MPa, on at least a part of a cutting edge and/or on at least a part of a rake face.

It is to be understood that both the foregoing general description and the following detailed description are exemplary and explanatory and are intended to provide further explanation of the invention as claimed.

DETAILED DESCRIPTION

The present invention relates to coated cutting tool comprising a body of generally polygonal or round shape having at least one rake face, at least one clearance face and at least one cutting edge comprising a coating and a substrate. The present invention further relates to a method of making a tool according to the invention.

An exemplary embodiment of a coated cutting tool comprises a coating and a substrate where the substrate is at least partly coated with a 4-10 μm thick coating comprising two adjacent Ti(C,N)-layers, an inner Ti($C_x$,$N_y$)-layer, where x+y=1, and an outer Ti($C_i$,$N_j$)-layer, where i+j=1, and j>y and where the difference Δ between the residual stress state of the inner Ti($C_x$,$N_y$)-layer and the residual stress state of the outer Ti($C_i$,$N_j$)-layer is 1000 MPa≤Δ≤2500 MPa, on at least a part of the cutting edge and/or on at least a part of the rake face.

The inner Ti($C_x$,$N_y$)-layer is deposited in the low temperature region (750-835° C.) and the second outer Ti($C_i$,$N_j$)-layer is deposited at a higher temperature range (950-1050° C.). The outer layer has a higher N-content, that is j>y, and has compressive stresses, that is $\sigma_{outer}$<0 and $\sigma_{outer}$<$\sigma_{inner}$ where $\sigma_{outer}$ is the residual stress state of the outer Ti($C_i$,$N_j$)-layer and $\sigma_{inner}$ is the residual stress state of the inner Ti($C_x$,$N_y$)-layer.

The difference Δ in stress state, between the inner Ti($C_x$,$N_y$)-layer and the outer Ti($C_i$,$N_j$)-layer, is defined as:

$$\Delta = |\sigma_{outer}| + |\sigma_{inner}|, \text{ if } \sigma_{outer} < 0 \text{ and } \sigma_{inner} > 0, \text{ or}$$

$$\Delta = |\sigma_{outer}| - |\sigma_{inner}|, \text{ if } \sigma_{outer} < 0 \text{ and } \sigma_{inner} < 0.$$

In one embodiment the difference Δ between the residual stress state of the inner Ti($C_x$,$N_y$)-layer and the residual stress state of the outer Ti($C_i$,$N_j$)-layer is 1000 MPa≤Δ≤2500 MPa, on the cutting edge or on the rake face, or, on the cutting edge and on the rake face.

In one embodiment the residual stress state of the inner Ti($C_x$,$N_y$)-layer is +500 MPa to −400 MPa and the residual stress state of the outer Ti($C_i$,$N_j$)-layer is −900 MPa to −2400 MPa.

In one embodiment the residual stress state of both the inner Ti($C_x$,$N_y$)-layer and the outer Ti($C_i$,$N_j$)-layer is <0.

In one embodiment the inner Ti($C_x$,$N_y$)-layer has columnar grains with grain sizes within the range of 0.05-0.5 μm measured as the half width and the grains on a cross sectioned sample. The outer Ti($C_i$,$N_j$)-layer may be from columnar to more equiaxed shaped dependent on the layer thickness. The grain size of the different layers is measured on a SEM (Scanning Electron Microscopy) micrograph of a ground and polished cross section surface using the half width.

In one embodiment the inner Ti(Cx,Ny)-layer has a thickness of 2-6 μm and the outer Ti(Ci,Nj)-layer has a thickness of 2-6 μm.

In a further embodiment the inner layer has a pronounced (111) and/or (422) texture. That is, anything from medium strong (111) texture to strong (422) texture or a mixture of medium strong textures of both orientations. Therefore, the sum TC(111)+TC(422) is used to define the inner Ti($C_x$,$N_y$)-layer. Crystals grown in the <111> and <422> directions have similar orientations. The angle between corresponding crystal planes is only about 19°. The inner Ti($C_x$,$N_y$)-layer has a pronounced crystallographic texture with texture coefficients TC(111)+TC(422)≥2.5, where TC(111)>0.4 and TC(422)>0.4, where TC is defined by:

$$TC(hkl) = \frac{I(hkl)}{I_0(hkl)} \left\{ \frac{1}{n} \sum \frac{I(hkl)}{I_0(hkl)} \right\}^{-1}$$

where I(hkl) is determined by XRD and
I(hkl)=measured intensity of the (hkl) reflection
$I_0$(hkl)=standard intensity of the ASTM standard powder pattern diffraction data
n=number of reflections used in the calculation, (hkl) reflections used are:
(111), (200), (220), (331), (420), (422)

In yet a further embodiment, the coating further comprises a first, innermost, layer of Ti($C_m$,$N_n$) with a cubic structure m+n=1, with n>m, most preferably n>0.8, with equiaxed or elongated grains with an average diameter or length of <0.3 μm and with a total thickness (d) of 0.1<d<1.5 μm.

In one embodiment the cutting tool is coated is coated with a PVD-layer, e.g. $Al_2O_3$, Ti(Al,N), with a thickness of 0.5-3 μm, on top of the outer Ti($C_i$,$N_j$)-layer.

In one embodiment the substrate is made of cemented carbide, preferably WC based, cermet, cBN, high speed steel or ceramic material.

In a further embodiment the coated cutting tool is a cutting tool insert.

The invention also relates to a method of making a coated cutting tool comprising a coating and a substrate wherein the coating comprises two adjacent Ti(C,N)-layers, an inner Ti($C_x$,$N_y$)-layer, where x+y=1, and an outer Ti($C_i$,$N_j$)-layer, where i+j=1, and j>y and where the coating is subjected to a wet blasting operation resulting in a difference Δ between the residual stress state of the inner Ti($C_x$,$N_y$)-layer and the residual stress state of the outer Ti($C_i$,$N_j$)-layer of 1000 MPa≤Δ≤2500 MPa, on at least a part of the cutting edge and/or on at least a part of the rake face.

In one embodiment the process is preferably started with deposition of a thin TiN-start layer, 0.5-1 μm using conventional CVD-technique at 870-950° C. As the next layer the inner Ti($C_x$,$N_y$)-layer, with a thickness of 2-6 μm, is deposited using $TiCl_4$, $H_2$, $N_2$ and R—CN compound with R equal to $CH_3$ or/and $C_2H_5$ at a temperature in the range 750-850° C. The CVD-reactor is then heated up to 950-1050° C. in an atmosphere of $N_2$/$H_2$, e.g. in a 50:50 ratio. The outer Ti($C_i$,$N_j$)-layer, with a thickness of 2-6 μm, is then deposited at a pressure of 0.7-1 bar using $TiCl_4$, HCl, $H_2$, $N_2$, with or without an addition of 3-6% $CH_4$ to give the outer Ti($C_i$,$N_j$)-layer a higher N-content than the inner Ti($C_x$,$N_y$)-layer. After completing the coating process the CVD-reactor is flushed with $N_2$ for 2 h at a pressure of 0.8-1 bars pressure and at 950-1050° C.

The coated inserts are then subjected to a blasting operation with the aim to smooth the coating surface as well as to change the stress state of the different layers to the desired levels.

In order to obtain a high surface smoothness and the high compressive stresses, the coating is subjected to a wet blasting operation on at least a part of the cutting edge and/or on at least a part of rake face. Different blasting media can be used for the blasting operation, e.g. $Al_2O_3$ or $ZrO_2$ grits, small steel balls or other hard particles. The blasting media have to strike the coating surface with a high impulse. The impact force can be controlled by controlling the blasting pulp pressure, the distance between blasting nozzle and coating surface, grain size of the blasting media, the concentration of the blasting media and the impact angle of the blasting jet.

According to one embodiment the blasting operation is performed with a slurry consisting of water and $Al_2O_3$ grits of size F220 or finer (FEPA-standard) at an air pressure of 2.5-3.5 bar for about 2-8 sec/insert.

Blasting on both the cutting edge, rake- and clearance face is the preferred embodiment when cutting smearing materials like stainless steel or nodular cast iron, also when chip hammering may occur. Different blasting pressure can be used on the rake and the clearance side giving the layers different stress levels.

Example A

Invention

Cemented carbide inserts in style CNMG120408-QM, DCMT11T304-MF and DCET11T302-UM with the composition 10 wt % Co, 1 wt % Cr and WC were coated using CVD-techniques with a layer structure as follows. A first adhesion TiN-layer containing some carbon (due to indiffusion from the cemented carbide) with a thickness of approximate thickness of 1 μm deposited at 930° C. using $TiCl_4$, $H_2$ and $N_2$. An inner $Ti(C_x,N_y)$-layer with a thickness of 4 μm was deposited at 830° C. using $TiCl_4$, $H_2$, $N_2$ and $CH_3CN$. The reactor was heated up to 1000° C. in a $N_2/H_2$-atmosphere. Then a 2 μm thick outer TiN-layer was deposited using $TiCl_4$, $H_2$ and $N_2$. After the deposition process the inserts were heat treated for 2 h in an $N_2$ atmosphere at a temperature of 1000° C.

After the deposition process the inserts were subjected to an intensive wet blasting operation on the cutting edge and on the rake face. The blasting pressure was 2.8 bar and the inserts were blasted for 5 seconds.

Example B

Invention

The same cemented carbide substrates like in Example A were coated according to Example A except for that $CH_3CN$ was substituted for $C_2H_5CN$ and that the 2 μm top TiN-layer was substituted for bronze/copper coloured N-rich $Ti(Ci,N_j)$-layer. This layer was deposited at 1000° C. and 800 mbar by using $TiCl_4$, $CH_4$, $H_2$, $N_2$ and HCl as process gases.

Example C

Prior Art

Cemented carbide cutting inserts in style CNMG120408-QM, DCMT11T304-MF and DCET11T302-UM with the composition 10 wt % Co, 1 wt % Cr and WC were coated by using CVD-techniques with a layer structure as follows. A first adhesion Ti(C,N)-layer with the approximate composition of $TiC_{0.05}N_{0.95}$-layer with a thickness of 1 μm was deposited at 930° C. using $TiCl_4$, $H_2$ and $N_2$. A functional $Ti(C_x,N_y)$-layer with an approximate composition of $TiC_{0.56}N_{0.44}$ with a thickness of 5 μm was deposited at 845° C. (MT-CVD) using $TiCl_4$, $H_2$, $N_2$ and $CH_3CN$. A third layer of $Al_2O_3$ with a thickness of 0.7 μm was deposited at 1010° C. using $AlCl_3$, $H_2$, $CO_2$ and $H_2S$. Finally on top a multi-layer of TiN/TiC with a thickness of 1.1 μm was deposited by using $TiCl_4$, $H_2$, $CH_4$ and $N_2$. The composition of the coating layers was estimated by XRD and using Vegards Law.

After the deposition process the inserts were subjected to an intensive wet blasting operation on the cutting edge and on the rake face with a slurry consisting of water and $Al_2O_3$ grits of 240 mesh size. The spray gun had a 90 degree angle to the insert rake face. The blasting pressure was chosen to 2.6 bar so that the top TiN/TiC multi-layer and the $Al_2O_3$-layer were completely removed from the blasted surface. The rake face of the inserts showed a smooth shiny silver grey coloured surface.

Example D

Prior Art

Commercially available PVD coated inserts from a leading tool producer with a high toughness properties in style CNMG120408-QM, DCMT11T304-MF and DCET11T302-UM were used as references in the cutting tests. Coating was 4 μm TiN. The end user had selected this PVD-grade for his tough cutting operations and it was therefore used in the cutting tests below.

After the blasting operation a texture analysis was carried out on the inner $TiC_xN_y$-layer from Example A, B and C by using XRD-technique using an X-ray Diffractometer PAN X'Pert Pro MPD, equipped with a Cu—$K_\alpha$ X-ray source. Diffractometer settings: Bragg Brentano-geometry, voltage=45 kV, current=40 mA. Divergence/antiscatter slit=fixed 0.25°, soller slit=0.02 rad, scan range=20-130°.

Peak intensities I(hkl) for the hkl-reflections (111), (200), (220), (331), (420), (422) were measured (on the clearance side of the inserts) and used in the calculation of the texture coefficients TC(hkl) where:

$$TC(hkl) = \frac{I_{hkl}}{I_{0,hkl}} \left\{ \frac{1}{n} \sum_{1}^{n} \frac{I_{hkl}}{I_{0,hkl}} \right\}^{-1}$$

I(hkl)=measured intensity of the (hkl) reflection;
$I_0$(hkl)=standard intensity of the ASTM standard powder diffraction data No 42-1489, ref: Guilemany, J., Alcobe, X., Sanchiz, I., Powder Diffraction, volume 7, page 34 (1992);
n=number of reflections used in the calculation.

The following texture coefficients were obtained:

TABLE 1

Measured texture coefficients of the $Ti(C_x, N_y)$ selected from batches A, B and D

|  | TC(111) | TC(200) | TC(220) | TC(331) | TC(420) | TC(422) |
| --- | --- | --- | --- | --- | --- | --- |
| Example A Invention inner $Ti(C_x, N_y)$ | 2.24 | 0.48 | 1.30 | 0.83 | 0.53 | 0.62 |
| Example B Invention inner $Ti(C_x, N_y)$ | 0.48 | 0.02 | 0.19 | 0.63 | 0.24 | 4.33 |
| Example C Prior art $Ti(C_x, N_y)$ | 0.52 | 0.19 | 2.66 | 1.5 | 0.46 | 0.68 |

The residual stress σ, of the inner $TiC_xN_y$ layers were then evaluated on the blasted coating surface by using XRD measurements using the well known $\sin^2\psi$ method as described by I. C. Noyan, J. B. Cohen, Residual Stress Measurement by Diffraction and Interpretation, Springer-Verlag, New York, 1987 (pp 117-130).

The stress evaluation was carried out by using $\psi$-geometry on a X-ray diffractometer Bruker D8 Discover-GADDS equipped with laser-video positioning, Euler 1/4-cradle, rotating anode as X-ray source ($CuK_\alpha$-radiation) and an area detector (Hi-star). A collimator of size 0.5 mm was used to focus the beam. The analysis was performed on the $TiC_xN_y$ (422) reflection using the goniometer settings $2\theta=126°$, $\omega=63°$ and $\phi=0°, 90°, 180°, 270°$. Eight $\psi$ tilts between 0° and 70° were performed for each $\phi$-angle. The $\sin^2\psi$ method was used to evaluate the residual stress using the software DIFFRAC$^{Plus}$ Stress32 v. 1.04 from Bruker AXS with the constants Young's modulus, E=480 GPa and Poisson's ratio, $\nu=0.20$ and locating the reflection using the Pseudo-Voigt-Fit function. A biaxial stress state was confirmed and the average value was used as the residual stress value.

TABLE 2

Residual stress state:

| Variant | Residual stress Inner $Ti(C_x, N_y)$ | Residual stress outer $Ti(C_i, N_j)$ |
|---|---|---|
| Example A (invention) $Ti(C_x, N_y)$ and $Ti(C_i, N_j)$ | +330 MPa | −1350 MPa |
| Example B (invention) $Ti(C_x, N_y)$ and $Ti(C_i, N_j)$ | −75 MPa | −2100 MPa |
| Example C (prior art) $Ti(C_x, N_y)$ | −2600 MPa | — |

All cutting tests were carried out in the field at end users.

Cutting Test 1:

Inserts in style CNMG120408-QM coated according to example A, C and D were tested in a turning operation of a shaft made of low alloyed steel, 21CrMoV57, with a Brinell hardness 230. Operation classified as demanding flank and crater wear.

Cutting Data:

| | |
|---|---|
| Cutting speed: | 200 m/min |
| Feed rate: | 0.30 mm/rev |
| Depth of cut: | 3.25 mm |
| Coolant: | Emulsion |

Results:

Insert D was taken out after 43 components due to excessive wear and a high risk for breakage if further used. Insert A and C were run to 53 components and examined in a microscope. It was clear that insert A had less wear than insert C and hence could be used further.

Cutting Test 2:

Inserts in style DCMT11T304-MF coated according to example A, C and D were tested in a combined longitudal and facing turning operation of a shaft made of 42CrMo4 steel with a Brinell hardness of 250. Operation classified as demanding wear resistance, toughness and flaking of coating.

Cutting Data:

| | |
|---|---|
| Cutting speed: | 94 m/min |
| Feed rate: | 0.18 mm/rev |
| Depth of cut: | 1.7 mm |
| Coolant: | Emulsion |

Results:

Insert A (invention) produced 370 components
Insert C (prior art) "300"
Insert D (prior art) "340"

The reason for stopping cutting was wear and chipping along cutting edge with risk insert breakdown if further used.

Cutting Test 3:

Inserts in style DCET11T302-UM coated according to example A and C were tested in an external turning, axial finishing operation of an automobile component with a diameter of 30 mm made of alloyed steel SS22258-02.

Cutting Data:

| | |
|---|---|
| Cutting speed: | 336 m/min |
| Feed rate: | 0.08 mm/rev |
| Depth of cut: | 0.15 mm |
| Coolant: | Emulsion |

Results:

Insert A (invention) produced 265 components.
Insert C (prior art) produced 127 components.

The reason for stopping cutting was bad surface finish on the component.

Cutting Test 4:

DCMT 11T308-MM inserts from Example A, C and D were tested in a facing operation of an austenitic stainless steel bar, with cross-section 70*120 mm. One cycle consisted of a first interrupted cut to diameter 70 mm followed by a continuous cut to the final diameter 60 mm. In each test one corner of the insert was used as many cycles as possible before breakage of the insert edge. For each of the variants seven tests were run. Due to the work piece geometry the insert will exit and re-enter the workpiece during almost the whole operation except the very centre part. This test thus put high demands on toughness.

Cutting Data:

| | |
|---|---|
| Operation: | turning, facing |
| Material: | AISI 316 (SS2343-28 PRODEC) |
| Cutting speed: | 220 m/min |
| Feed: | 0.2 mm/r |
| Cutting depth: | 0.8 mm |
| Coolant: | Emulsion |

Results:

The insert according to the invention, Example A, made 27 cycles and the insert made according Example C (prior art), 25 and Example D (prior art) 10 cycles.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A coated cutting tool, comprising:
a coating; and
a substrate made of cemented carbide, cermet, cBN, or high speed steel,
wherein the substrate is at least partly coated with a 4-10 μm thick coating consisting of: an innermost layer of $Ti(C_m, N_n)$ with a cubic structure, m+n=1 and n>m; and
two adjacent Ti(C,N)-layers, consisting of:
an inner $Ti(C_x, N_y)$-layer, where x+y=1, and
an outer $Ti(C_i, N_j)$-layer, where i+j=1, and j>y, wherein the substrate coated with the 4-10 μm thick coating is subjected to a blasting operation on at least a part of a cutting edge and/or on at least a part of a rake face;

wherein the difference Δ between a residual stress state of the inner Ti($C_x$,$N_y$)-layer and a residual stress state of the outer Ti($C_i$,$N_j$)-layer is 1000 MPa≤Δ≤2500 MPa, on at least the part of the cutting edge and/or on at least the part of the rake face, wherein the residual stress state of the inner Ti($C_x$,$N_y$)-layer is +500 MPa to −400 MPa and the residual stress state of the outer Ti($C_i$,$N_j$)-layer is −900 MPa to −2400 MPa; and wherein the innermost layer of Ti($C_m$,$N_n$) of the coating is directly deposited on the substrate and the outer Ti($C_i$,$N_j$)-layer is an outermost layer of the coating.

2. The cutting tool according to claim 1, wherein the residual stress state of both the inner Ti($C_x$,$N_y$)-layer and the outer Ti($C_i$,$N_j$)-layer is <0.

3. The cutting tool according to claim 1, wherein $\sigma_{outer}$<0 and $\sigma_{outer}$<$\sigma_{inner}$, where $\sigma_{outer}$ is the residual stress state of the outer Ti($C_i$,$N_j$)-layer and $\sigma_{inner}$ is the residual stress state of the inner Ti($C_x$,$N_y$)-layer.

4. The cutting tool according to claim 1, wherein the inner Ti($C_x$,$N_y$)-layer has a texture TC(111)+TC(422)≥2.5.

5. The cutting tool according to claim 4, wherein the residual stress state of the inner Ti($C_x$,$N_y$)-layer is +500 MPa to −400 MPa and the residual stress state of the outer Ti($C_i$,$N_j$)-layer is −900 MPa to −2400 MPa.

6. The cutting tool according to claim 4, wherein the residual stress state of both the inner Ti($C_x$,$N_y$)-layer and the outer Ti($C_i$,$N_j$)-layer is <0.

7. The cutting tool according to claim 4, wherein $\sigma_{outer}$<0 and $\sigma_{outer}$<$\sigma_{inner}$, where $\sigma_{outer}$ is the residual stress state of the outer Ti($C_i$,$N_j$)-layer and $\sigma_{inner}$ is the residual stress state of the inner Ti($C_x$,$N_y$)-layer.

8. A method of making a coated cutting tool, the coated cutting tool including a coating and a substrate made of cemented carbide, cermet, cBN, or high speed steel wherein the coating consisting of an innermost layer of Ti($C_m$,$N_n$) with a cubic structure, m+n=1 and n>m; and two adjacent Ti(C,N)-layers, consisting of: an inner Ti($C_x$,$N_y$)-layer, where x+y=1; and an outer Ti($C_i$,$N_j$)-layer, where I+j=1, and j>y, the method comprising:

subjecting the coating to a wet blasting operation resulting in a difference Δ between a residual stress state of the inner Ti($C_x$,$N_y$)-layer and a residual stress state of the outer Ti($C_i$,$N_j$)-layer of 1000 MPa≤Δ≤2500 MPa, on at least a part of a cutting edge and/or on at least a part of a rake face, wherein the residual stress state of the inner Ti($C_x$,$N_y$)-layer is +500 MPa to −400 MPa and the residual stress state of the outer Ti($C_i$,$N_j$)-layer is −900 MPa to −2400 MPa; and wherein the innermost layer of Ti($C_m$,$N_n$) of the coating is directly deposited on the substrate and the outer Ti($C_i$,$N_j$)-layer is an outermost layer of the coating.

9. The method according to claim 8, wherein the residual stress state of both the inner Ti($C_x$,$N_y$)-layer and the outer Ti($C_i$,$N_j$)-layer is <0.

10. The method according to claim 8, wherein $\sigma_{outer}$<0 and $\sigma_{outer}$<$\sigma_{inner}$, where outer is the residual stress state of the outer Ti($C_i$,$N_j$)-layer and $\sigma_{inner}$ is the residual stress state of the inner Ti($C_x$,$N_y$)-layer.

11. The method according to claim 8, wherein the inner Ti($C_x$,$N_y$)-layer has a texture TC(111)+TC(422)≥2.5.

* * * * *